Dec. 25, 1956    S. B. BRACY ET AL    2,775,756
FACSIMILE RECORDER COMPUTER
Filed March 3, 1955    3 Sheets-Sheet 1

$H = R \sin \alpha$
$GR = R \cos \alpha$
$X = R \cos \alpha \sin \phi$
$Y = R \cos \alpha \cos \phi$ INVENTORS.
SYLVANUS B. BRACY
PAUL M. LEVY
ROCCO L. SARLO
BY Frederick M. Strader
ATTORNEY INVENTORS.
SYLVANUS B. BRACY
PAUL M. LEVY
ROCCO L. SARLO
BY Frederick M. Shrader
ATTORNEY Dec. 25, 1956 S. B. BRACY ET AL 2,775,756
FACSIMILE RECORDER COMPUTER
Filed March 3, 1955 3 Sheets-Sheet 3
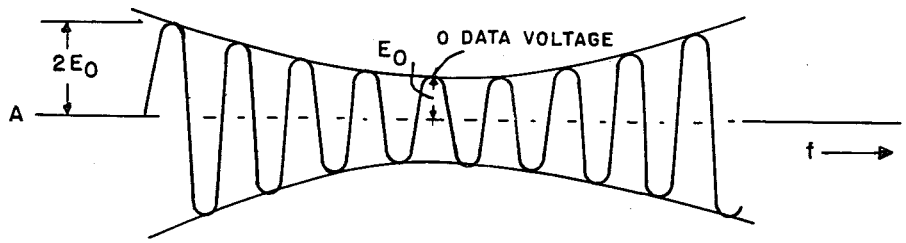
FIG. 5
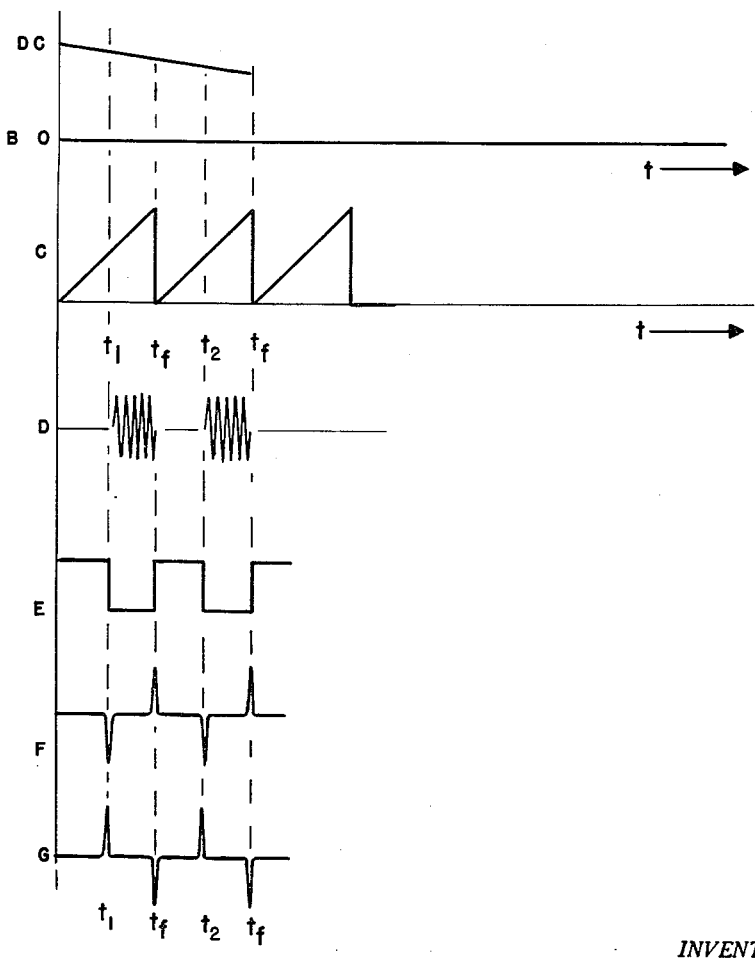
INVENTORS.
SYLVANUS B. BRACY
PAUL M. LEVY
ROCCO L. SARLO
BY
Frederick M. Strader
ATTORNEY

2,775,756

Patented Dec. 25, 1956

2,775,756

FACSIMILE RECORDER COMPUTER

Sylvanus B. Bracy, Eatontown, N. J., and Paul M. Levy, New York, and Rocco L. Sarlo, Mamaroneck, N. Y., assignors to the United States of America as represented by the Secretary of the Army Application March 3, 1955, Serial No. 492,058

7 Claims. (Cl. 343—11)

(Granted under Title 35, U. S. Code (1952), sec. 266)

The invention described herein may be manufactured and used by or for the Government for governmental purposes, without the payment of any royalty thereon.

This invention relates to a computer and more particularly to a facsimile recorder computer adapted to plot the rectangular coordinates of a target projectile in flight.

In locating projectiles in flight, mortar shells for example, the azimuth, range, and elevation tracking radar information is usually obtained from plots derived from separate styli. Such systems heretofore used have proved to be too bulky, complex, and heavy, from a mechanical standpoint to permit adequate mobility and to lend themselves to be set up quickly for field operation.

It is therefore an object of the present invention to provide an improved recorder computer for plotting the rectangular coordinates of a target projectile in flight which is more compact, less bulky, and more readily adapted to be quickly set up for field operation.

It is another object of the present invention to provide an improved recorder computer utilizing only one stylus for continuously and simultaneously plotting the range and height coordinates of a target projectile.

It is still another object of the present invention to provide an improved recorder computer wherein the height and range data coordinates of a target projectile in flight are continuously plotted on a single graph.

In accordance with the present invention the system for continuously plotting the range and height coordinates of a target projectile in flight includes means for generating discrete coordinate data voltages having instantaneous magnitudes proportional respectively to the instantaneous height position of the projectile and to two prescribed coordinates of the instantaneous azimuth position of the projectile with respect to a fixed reference position. Also included are a recording drum adapted to be rotatively driven at a prescribed rate of speed, a stylus synchronously driven with the drum and adapted to move axially thereof, and means operatively associated with the drum and the stylus for periodically generating a linear sweep reference voltage having a period corresponding in time to one complete revolution of the drum. Included further are discrete means responsive to the difference of each of the detected coordinate data voltages and the reference sweep voltage for generating discrete pulse signals when a point on the sweep voltage coincides with the instantaneous magnitude of the respective coordinate data voltages, and means responsive to the discrete pulse signal outputs for energizing the stylus whereby a mark is produced on the drum in accordance with the height position and the two prescribed coordinates of the azimuth position of the target projectile. Also included are means responsive respectively to the voltage amplitude at the beginning and end of the sweep voltage for generating discrete pulse reference signals of prescribed width corresponding in time to the beginning and end of the axial traverse of the stylus for each revolution of the drum, and means responsive to each of said reference pulse signals for energizing the stylus whereby a mark is produced on the drum in accordance with the beginning and end of the sweep reference voltage.

For a better understanding of the invention, together with other and further objects thereof, reference is had to the following description taken in connection with the accompanying drawings in which:

Figure 5 illustrates a group of explanatory curves.

Figure 1:
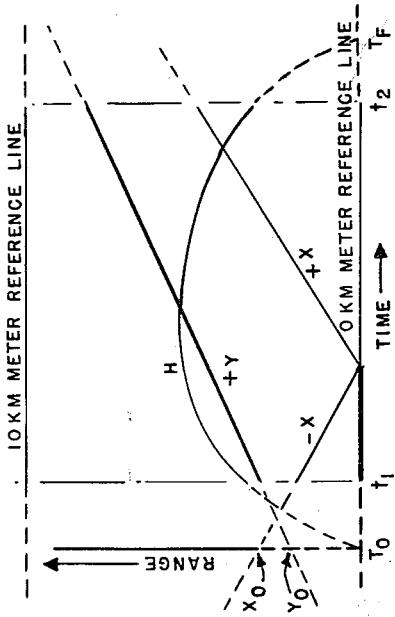
Figure 1 is a curve illustrating the trigonometric relationships which form the basis of the invention.

Figure 1 illustrates the trigonometric relationships involved in determining the X and Y distance coordinates of the azimuth position and the height position H of a projectile in flight with respect to a tracking radar located at O, the origin of the X and Y axes. At any particular time $t$, the projectile may be assumed to be at the point P. From Figure 1 the following trigonometric relationships are obvious:

$$H = R \sin \alpha \qquad (1)$$
$$GR = R \cos \alpha \qquad (2)$$
$$X = R \cos \alpha \sin \phi \qquad (3)$$
$$Y = R \cos \alpha \cos \phi \qquad (4)$$

where $H$ = height of target from ground
$R$ = slant range of target
$GR$ = ground range of target,
$\alpha$ = angle of elevation of radar tracking antenna
$\phi$ = azimuth angle of radar tracking antenna measured in clockwise direction from the positive Y ordinate which represents 0° azimuth, and
X and Y are the rectangular coordinates corresponding to the azimuth angle $\phi$.

These inherent trigonometric relationships form the basis of the present invention.

Figure 3:
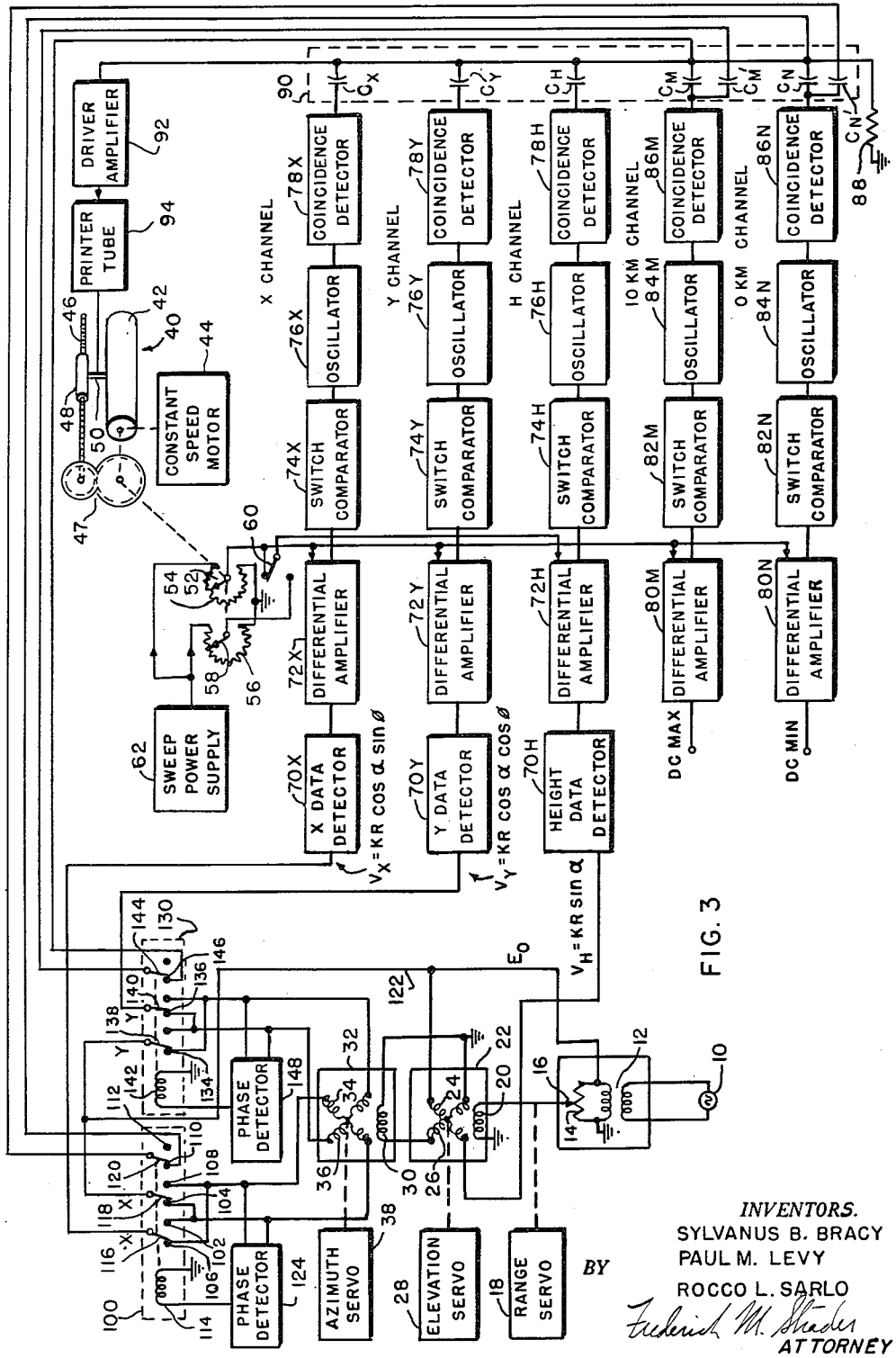
Figure 3 is a schematic block diagram of the present invention.

Referring now to the block diagram of Figure 3, at 10 there is shown a 400-cycle voltage source having its output coupled through transformer 12 to a range potentiometer 14 for generating a voltage analog of the slant range. Slider arm 16 of range potentiometer 14 is driven by the output of a suitable range servo 18 such that the position of slider arm 16 will produce an output voltage proportional to the slant range of the target projectile from the location of the radar. Although any suitable proportional factor may be used, it was found that a proportional factor of $2.6 \times 10^{-3}$ volts/meter, or 26 volts amplitude for a range of 10,000 meters, produced optimum practical results. This factor will hereinafter be referred to as K. The voltage output from slider 16 may then be represented by $$V_R = KR \qquad (5)$$

where R is the slant range for any selected target. The voltage $V_R = KR$ is applied to the stator winding 20 of an elevation resolver 22 which includes rotor coils 24 and 26 adapted to produce, respectively, the sine and cosine function of the stator input voltage applied through slider 16. The shaft of elevation resolver 22 is geared to follow the radar tracking antenna in elevation and is driven by a suitable elevation servo 28. With $\alpha$ being the angle of elevation, the two voltage outputs or analogs from rotor coils 24 and 26 are, respectively, $$V_H = KR \sin \alpha \qquad (6)$$

and $$V_{GR} = KR \cos \alpha \tag{7}$$

The derived voltage $V_{GR}=KR \cos \alpha$ is applied to the stator winding 30 of an azimuth resolver 32 which includes rotor coils 34 and 36 geared to follow the radar tracking antenna in azimuth by means of azimuth servo 38 and adapted to produce the sine and cosine function of the stator input voltage. With $\phi$ being the azimuth tracking angle as measured in a clockwise direction, the two voltage outputs, or analogs, from rotor coils 34 and 36 are, respectively, $$V_X = KR \cos \alpha \sin \phi \tag{8}$$

and $$V_Y = KR \cos \alpha \cos \phi \tag{9}$$

From the trigonometric relationships described in Figure 1, it is readily apparent that the derived resolver voltages $V_H$, $V_X$ and $V_Y$ of Equations 6, 8 and 9, represent three 400-cycle voltage amplitudes proportional to the height H and the range distance coordinates X and Y, respectively, required to locate a projectile with respect to a prescribed radar location after a time $t$. The instantaneous magnitude of each of the 400-cycle voltages, of course, depends upon the azimuth and elevation of the radar tracking antenna and the range of the projectile therefrom at a particular time $t$. Voltages $V_H$, $V_X$ and $V_Y$ will hereinafter be referred to as coordinate data voltages.

As will hereinafter be explained, the magnitudes of the voltages $V_H$, $V_X$ and $V_Y$ are graphically depicted on recording mechanism 40 as a function of time together with two prescribed voltages, one of which designates a zero range distance reference line, hereinafter referred to as the 0 KM reference line, and the other designates a maximum range reference line corresponding to 10,000 meters, hereinafter referred to as the 10 KM reference line. The coordinate data voltages and the two reference line voltages are applied to the recording medium 40 through discrete channels.

The recording mechanism 40 has a revolvable electrode drum 42 for accommodating a recording chart of electrolytic or otherwise electro-responsive paper. The shaft of drum 42 is driven by a constant speed drive motor 44. A feed screw 46 is also driven from the shaft of drum 42 by means of a suitable gear transmission 47. A carrier 48 in threaded engagement with screw 46 carries a stylus electrode 50 and performs a translating motion parallel to the drum axis. Since the drum is driven at a constant speed, the stylus 50 will translate at a fixed speed. By such an arrangement the translating stylus thus becomes the time axis of the plots. The shaft of drum 42 also drives the rotating arm 52 of a linear potentiometer 54 adapted to provide a sawtooth sweep voltage having a magnitude corresponding to a selected maximum range of 10,000 meters; viz., 26 volts, for each complete revolution of drum 42. This voltage represents the vertical position of the stylus with respect to the prescribed 0 KM reference line to be hereinafter described. Any suitable means well known in the art may be provided to rapidly return stylus 50 to its original starting position after the end of each axial traverse of said stylus along drum 42. For projectiles that do not attain a height greater than 2500 meters, greater accuracy on an expanded scale is provided by a second linear potentiometer 56 having its rotating arm 58 also driven in synchronism with the shaft of drum 42 and adapted to provide a sawtooth sweep voltage having a magnitude corresponding to a selected maximum range of 2500 meters. The 2500 meter reference voltage is applicable only to the height data coordinate voltage. A switch 60 is provided to select the output from either linear potentiometer. The output from 10,000 meter potentiometer 54 will hereinafter be referred to as the 10 KM sweep reference voltage, and the output of the 2500 meter potentiometer 56 will be referred to as 2.5 KM sweep reference voltage. The direct-current voltages applied across both potentiometers may be provided by any suitable power supply as shown at 62.

Stylus 50 is responsive to the outputs from five discrete channels, each adapted to provide the stylus with a discrete current pulse. The channels providing stylus current pulses corresponding to the respective coordinate data voltages, hereinafter referred to as the H, X and Y channels, each comprises a data detector 70, a differential amplifier 72, a switch comparator 74, an oscillator 76, a coincidence detector 78, and a differentiating circuit 90. Subscripts H, X and Y designate the corresponding identical components of each data voltage channel. The remaining two channels, hereinafter referred to as the 0 KM channel and the 10 KM channel, respectively, each comprises a differential amplifier 80, a switch comparator tube 82, an oscillator 84, a coincidence detector 86, and differentiating circuit 90. Subscripts M and N designate the corresponding identical components of the 10 KM and 0 KM channels, respectively. The differentiating circuit 90 includes discrete capacitors $C_H$, $C_X$, $C_Y$, $C_M$ and $C_N$ associated with respective channels and a common resistor 88 electrically connected in series with each of the discrete capacitors. Connected to the output of differentiating circuit 90 is a driver amplifier 92 which output drives a printer tube 94 which, in turn, energizes stylus 50.

As shown, the height data coordinate voltage $V_H$ is applied from coil 24 to data detector $70_H$ to produce a positive direct-current voltage output whose magnitude corresponds to the instantaneous amplitude of $V_H$. The output of detector $70_H$ is applied to one input of differential amplifier $72_H$ and the 10 KM sweep reference voltage is applied to the other input of differential amplifier $72_H$ through switch 60. The difference signal output from amplifier $72_H$ is applied to oscillator $76_H$ through switch comparator tube $74_H$ which is maintained non-conductive until such time as the instantaneous output from data detector $70_H$ is of the same magnitude as the instantaneous voltage from the 10 KM sweep voltage which, of course, is a function of the angular displacement of recording drum 42 from its zero position. Oscillator $76_H$ is so connected to switch comparator tube $74_H$ that it is triggered into oscillation only when comparator tube $74_H$ is rendered conductive. The output of oscillator $76_H$ is applied to coincidence detector $78_H$ to produce a negative detected pulse which is applied to the differentiating circuit 90 comprising capacitor $C_H$ and resistance 88. The negative and positive peaks of the differentiated output are inverted in driver amplifier 92, the output of which is applied to printer tube 94. Printer tube 94 is so biased that it is rendered conductive only when positive pulses are applied thereto. When rendered conductive, the plate current of printer tube 94 flows through stylus 50 thereby producing a mark corresponding to the height data voltage on the electro-responsive paper wrapped around drum 42.

In order to overcome diagonal clipping and thus provide linear detection in the output from data detector $70_H$ as the height data voltage approaches zero, a 400-cycle stacking voltage $E_0$, which is the range potentiometer 14 excitation voltage, is added to data voltage $V_H$ derived from coil 24 of elevation resolver 22. Although any suitable value of $E_0$ may be used, it has been found that, for optimum results, stacking voltage $E_0$ was computed to be 26 volts RMS. By this arrangement, insofar as it affects the height data voltage $V_H$, the output of the height data detector is raised by a voltage $E_0$, 26 volts RMS, which is always in phase with the height data voltage. This results in the detector output being between 36.6 volts direct-current and 73.2 volts direct current, assuming a maximum range of 10,000 meters. In order to properly align the amplitude of the 10 KM sweep voltage with that of stacked data voltage, the amplitude of the 10 KM sawtooth sweep is made to vary between 36.6 volts and 73.2 volts for each complete revolution of drum 42 by any suitable means. The lower voltage limit represents zero range and the upper voltage limit represents the assumed maximum range of 10,000 meters.

The data voltage $V_X$ derived from coil 34 of azimuth resolver 32 is applied to data detector 70x through a code relay 100 which comprises the following: Contacts 102 and 104 connected to one terminal of resolver winding 34; contacts 106 and 108 connected to the other terminal of resolver winding coil 34; contact 110 connected to the junction terminal of capacitor $C_N$ and resistor 88; open contact 112; relay coil 114; and relay switches 116, 118 and 120. Switches 116 and 118 are connected to the terminals of resolver coil 34 and switch 120 is connected to one terminal of a capacitor $C_N'$, the other end of capacitor $C_N'$ having a common connection with the other terminal of $C_N$. With relay coil 114 unenergized, the positions of the switches are arranged as shown in Figure 3 so that the data voltage is applied to data detector 70 through switch 116 and contact 106, and capacitor $C_N'$ is connected in parallel arrangement with capacitor $C_N$ through switch 120 and contact 110. To overcome diagonal clipping in data detector 70x the 400-cycle stacking voltage $E_0$ is applied to said one terminal of winding 34 through lead 122, through switch 118, and through contact 104 when relay coil 114 is unenergized, or to said other terminal of coil 34 through contact 108 when relay coil 114 is energized as hereinbelow described. As the winding 34 goes through a null, the phase of the 400-cycle coordinate data voltage $V_X$ is reversed. A phase detector 124 having its input connected across the output terminals of winding 34 is provided to energize relay coil 114 only when such phase reversal has taken place. With relay coil 114 thus energized, capacitor $C_N'$ is disconnected from capacitor $C_N$ in the output of the 0 KM channel through relay switch 120 and the input to data detector 70x from winding 34 is reversed through relay switches 116 and 118. By such an arrangement the coordinate data voltage $V_X$ applied to the input of data detector 70x will always be in phase with the stacked voltage $E_0$ regardless of the shaft position of azimuth resolver 38 so that the direct-current output voltage from data detector 70x will vary between the same upper and lower voltage limits as the 10 KM sweep reference voltage, viz., 36.6 volts to 73.3 volts direct current. The output of phase detector 124 is arranged so that for an assumed positive output voltage from winding 34, viz., one side of a null position, coil 114 will be unenergized. Thus $C_N'$ is connected across $C_N$ when $V_X$ is positive and disconnected from $C_N$ when $V_X$ is negative. The remaining components of the X channel are structurally and functionally identical to the H channel and produce a spot on the electrolytic paper wrapped around drum 42 corresponding to the coordinate $V_X$ data voltage.

The coordinate data voltage $V_Y$ derived from winding 36 of azimuth resolver 38 is applied to data detector 70y through the contacts of code relay 130 which is identical in construction to code relay 100. The $V_Y$ coordinate data voltage output from coil 36 is applied to data detector 70y through relay contact 136 by means of switch 140 when relay coil 142 is unenergized. Also, with relay coil 142 unenergized, a capacitor $C_M'$ is connected in parallel arrangement with capacitor $C_M$ of the 10 KM channel through switch 144 and contact 146, and stacking voltage $E_0$ is applied to the other terminal of winding 36 through relay switch 138 and contact 134. Phase detector 148 is provided across the terminals of winding 36 to energize relay coil 142 when there is a reversal in phase of the 400-cycle excitation voltage when winding 36 goes through a null. With coil 142 thus energized, capacitor $C_M'$ is disconnected from capacitor $C_M$ in the 10 KM channel and the input to data detector 70y from coil 36 is reversed to maintain the input to detector 70y between $E_0$ and $2E_0$ regardless of the shaft position of azimuth resolver 38. The output of phase detector 148 is arranged so that for an assumed positive output voltage from winding 36, coil 142 will be unenergized and thus $C_M'$ will be connected across $C_M$ only when $V_Y$ is positive. The remaining components of the Y channel are functionally and structurally identical to those of the H channel to produce a spot on the electrolytic paper wrapped around drum 42 corresponding to the $V_Y$ coordinate data voltage.

Figure 2:
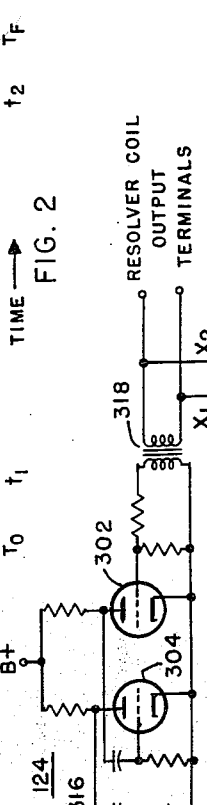
Figure 2 is a curve illustrating the recorded plots.

The distance function of the projectile is determined by the spacing between two horizontal reference lines marked on the electrolytic paper wrapped around drum 42. One of these lines designates the 0 KM reference line and represents zero range; the other reference line represents the prescribed maximum range of 10,000 meters and is designated as the 10 KM reference line which shows the actual plot of the coordinate data voltages applied to stylus 50. These two lines are illustrated in Figure 2. The 0 KM reference line is generated through the 0 KM channel and the 10 KM reference line is generated through the 10 KM channel. As hereinabove mentioned, each of these channels comprises a differential amplifier 80, a switch comparator tube stage 82, an oscillator 84, a coincidence detector circuit 86 and a differentiating circuit 90, the subscript M denoting the components of the 10 KM channel and the subscript N denoting the components of the 0 KM channel. The 10 KM sawtooth reference voltage is applied to one input of differential amplifier $80_M$, while a direct-current voltage equal to the maximum amplitude of the 10 KM sawtooth reference voltage is applied to the other input of differential amplifier $80_M$. Thus at the end of each revolution of drum 42 when stylus 50 has reached its maximum vertical position with respect to its initial position, a point will be burned or marked on the electrolytic paper wrapped around drum 42 in a manner similar to that described in connection with the H, X, and Y channels. In a similar manner, a point will be burned or marked at the initial starting position of stylus 50 by means of the output from the 0 KM channel. In this channel, the reference voltage to one input of differential amplifier $80_N$ is chosen to be equal to the minimum amplitude voltage level of the 10 KM reference sawtooth voltage applied to the other input of differential amplifier $80_N$. Thus, at the beginning of each 10 KM sawtooth reference sweep corresponding to the initial starting position of stylus 50 prior to another complete revolution of drum 42, a spot will be marked or burned on the electrolytic paper.

As shown in Figure 3 and hereinabove described, the output from the 0 KM channel coincidence detector $86_N$ is applied to differentiating circuit 90 through the parallel arrangement of capacitor $C_N'$ and $C_N$ when the derived data voltage $V_X$ is in the assumed negative direction and only through capacitor $C_N$ when the derived data voltage $V_X$ is in the assumed positive direction. Similarly, the output from the 10 KM channel coincidence detector $86_M$ is applied to differentiating circuit 90 through the parallel arrangement of capacitors $C_M$ and $C_M'$ when the derived data voltage $V_Y$ is in the assumed negative direction and only through capacitor $C_M$ when the derived data voltage $V_Y$ is in the assumed positive direction. By such an arrangement, the pulses applied to stylus 50 from the 0 KM reference channel will be of longer duration when $V_X$ is negative than when $V_X$ is positive, and similarly the pulses applied to stylus 50 from the 10 KM reference channel will be of longer duration when $V_Y$ is negative than when $V_Y$ is positive. Thus, a coding arrangement is provided whereby the 0 KM reference line will be thicker when $V_X$ is negative than when $V_X$ is positive. Likewise, the 10 KM reference line will be thicker when $V_Y$ is negative than when $V_Y$ is positive. In order to differentiate between the X and Y data voltages, the value of capacitor $C_Y$ is made greater than the value of capacitor $C_X$ so that the line representing $V_Y$ data voltage will be thicker than the line representing the $V_X$ component. The $V_H$ data voltage will always be represented as a parabolic curve. These curves are illustrated in Figure 2 which shows the plots of $V_H$, $V_x$ and $V_Y$ between two finite times $t_1$ and $t_2$.

Figure 4:
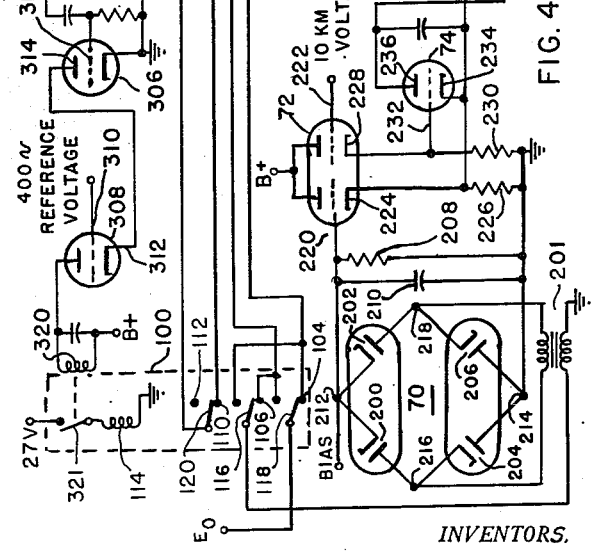
Figure 4 is a detailed schematic diagram illustrating one typical pulse generating channel shown in Figure 3.

The typical operation of a channel will be described in connection with Figures 4 and 5. The X and Y channels are identical. The H channel is similar to the X and Y channels except that no coding relays are needed and hence no phase detector is required. The components of the 0 KM and 10 KM reference channels are similar to the corresponding components in the X, Y or H channels. Referring now to Figures 4 and 5, detector 70 comprises diodes 200, 202, 204 and 206 connected as a full wave rectifier. The data input voltage comprises an amplitude modulated 400-cycle carrier, Figure 5, which is applied to the input terminals 216 and 218 of detector 70 through transformer 201. The rectified output voltage is developed across the filter circuit comprising the parallel arrangement of resistor 208 and capacitor 210 which is connected between output terminals 212 and 214 of detector 70. The input data voltage is applied to data detector 70 through relay contact 106 and relay switch 116 when code relay coil 114 is unenergized. Also, relay switch 120 is connected to contact 110. Stacking voltage $E_0$ is applied to the terminals of the output data voltage resolver winding through relay switch 118.

The carrier in Figure 5A is shown as being modulated by a linear varying voltage data signal whose amplitude is a function of the rotating resolver windings. As shown, when the voltage data signal is zero, the voltage applied to data detector 70 comprises the stacking voltage $E_0$. The rectified output voltage developed across resistor 208, Figure 5B, is applied to one input grid 220 of differential amplifier 72. The 10 KM sawtooth reference voltage shown in Figure 5C is applied to the other input grid 222 of the differential amplifier. Cathode 224 of the differential amplifier is connected to ground through cathode resistor 226 while the other cathode 228 is connected to ground through cathode resistor 230. The outputs of cathodes 226 and 228 are connected respectively to the grid 232 and cathode 234 of switch comparator tube 74. By such an arrangement, the coordinate data voltage is effectively subtracted from the 10 KM sweep reference voltage and the difference output is applied between grid 232 and cathode 234 of switch comparator tube 74. Tube 74 will remain cut off as long as grid 232 is negative with respect to cathode 234. This cutoff condition will exist until such time as the instantaneous 10 KM sweep reference voltage and the amplitude of the instantaneous coordinate data voltage applied to differential amplifier grid 220 are equal. Two such times are illustrated at $t_1$ and $t_2$ in Figure 5C. At this point, the difference voltage output from differential amplifier 72 will be such that the voltage applied to grid 232 will become positive with respect to cathode 234. Plate 236 of switch tube 74 is connected to the cathode 238 of a conventional plate tickler feedback type oscillator tube 76 whose control grid 240 is connected to cathode 234 of switch tube 74. With switch control tube 74 cut off, there is an open circuit between grid 240 and cathode 238 of oscillator 74 but with switch tube 74 conductive, grid 240 is returned to oscillator cathode 238 so that tube 76 will be triggered into oscillation only at times $t_1$, $t_2$, etc., as illustrated in curve 5D.

The output of oscillator 76 is coupled to cathode 242 of coincidence detector 78 which is connected to ground through resistor 244. The negative detected output from plate 246 of detector 78 is developed across resistor 248, shown in curve 5E, and differentiated through capacitor $C_x$ and resistor 88 to form the negative and positive peaks shown in curve 5F. The differentiated voltage is applied to input grid 250 of driver amplifier 92 to invert and amplify the differentiated signal output from detector 78, Figure 5G, and the amplified differentiated output is coupled from driver plate 252 through capacitors 254 to grid 258 of normally non-conductive printer tube 94. Tube 94 is biased so that only the positive output peaks from driver tube will cause printer tube 94 to conduct. Stylus 50 is in the plate circuit of printer tube 94 so that current will flow through stylus 50 and mark the electrolytic paper wrapped around drum 42 only when printer tube 94 is rendered conductive.

The data voltage resolver output is also applied to the input of phase detector 124 which comprises a first amplifier 302, a second amplifier 304, and a pair of serially connected phase comparator output tubes 306 and 308. The output tubes are so connected that they will both conduct only when the voltages applied to their respective grids are in phase. When the two voltages are out of phase, no current will flow. An output relay coil 320 is connected in the plate circuit of tube 308 and is adapted to actuate switch 321 when tube 308 is rendered conductive. When closed, switch 321 applies an energizing voltage to code relay coil 114. A reference 400-cycle voltage is applied to grid 310 of tube 308 whose cathode 312 is connected to the plate 314 of tube 306. The data voltage resolver output is applied to grid 316 of tube 306 through transformer 318 and amplifiers 302 and 304. When the resolver data output voltage is out of phase with the reference voltage, for example when $V_x$ is negative, no current flows in output relay coil 320 and switch 321 is open so that code relay 114 remains unenergized. As hereinabove described, the resolver output is then applied through code relay contact 106 and switch 116 and capacitor $C_N'$ is connected in parallel arrangement with $C_N$. With data $V_x$ positive, the reference voltage will be in phase with the data voltage, thereby causing current to flow in coil 320 which in turn causes code relay coil 114 to become energized. The input to data detector 70 is now reversed and simultaneously, through code relay 100, capacitor $C_N'$ is disconnected from capacitor $C_N$ in the output of the 0 KM channel.

For any particular coordinate data voltage, the greater the magnitude the higher the mark will be imprinted on the electrolytic paper. A mark corresponding to each of these voltages will appear for each revolution of drum 42, and since the stylus 50 translates linearly with time, as shown in Figure 2, a series of points that varies in height from the 0 KM reference line in accordance with the magnitude of the applied data voltages will appear as a smooth curve when plotted against time. To locate the projectile, the plots X, Y and H and the 0 KM reference line are extrapolated as shown by the dashed lines. The intersection $T_0$ between the H plot and the 0 KM reference line represents the time that the projectile passed through the radar datum plane. At this time the azimuth position of the projectile may be determined by $X_0$ and $Y_0$. A similar procedure may be used in finding the impact point $t_t$.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for continuously plotting the range and height coordinates of a target projectile in flight with respect to time from a prescribed reference position comprising means for generating discrete, coordinate data voltages having instantaneous magnitudes proportional respectively to the instantaneous height position of said projectile and to two prescribed coordinates of the instantaneous azimuth position of said projectile with respect to said reference position, means for detecting each of said coordinate data voltages, a recording drum adapted to be rotatably driven at a prescribed rate of speed, a stylus synchronously driven with said drum and adapted to move axially of said drum, means operatively associated with said drum and said stylus for periodically generating a linear sweep voltage having a prescribed slope, the period of said sweep voltage corresponding in time to one complete revolution of said drum, discrete means responsive to the difference of each of said detected coordinate data voltages and said sweep voltage for generating discrete pulse signals when a point on said sweep voltage is equal to the instantaneous magnitude of respective coordinate data voltages, and means responsive to said discrete pulse signals for energizing said stylus whereby a mark is produced on said drum in accordance with the height position and the two prescribed coordinates of the azimuth position of said target projectile.

2. The system in accordance with claim 1 whereby each of said discrete means comprises a differential amplifier having an output equal to the difference between the detected coordinate voltage and said sweep voltage, a switch comparator tube, normally non-conductive, responsive to said difference output and adapted to be rendered conductive only when the instantaneous magnitude of said detected voltage coincides with an amplitude level of said sweep voltage, an oscillator having its control grid connected to its cathode through said switch comparator tube whereby said oscillator is excited only when said comparator tube is rendered conductive, a coincidence detector responsive to the oscillation signal, means for differentiating the output of said coincidence detector whereby peaked pulses of prescribed width are generated corresponding to the beginning and end of the coincidence detector output signal, and means responsive to the first of said peaked pulses for energizing said stylus.

3. The system in accordance with claim 2 wherein each of said differentiating means comprises a respective capacitor in the output circuit of each of said coincidence detectors and a common resistor connected in series with each of said capacitors.

4. In combination with a radar tracking system adapted to provide range, elevation, and azimuth information of a projectile in flight with respect to a prescribed reference position, means for continuously plotting range and height information comprising an alternating current reference voltage source having a prescribed frequency, means coupled to said source for generating a first voltage proportional to the slant range, means for resolving said first voltage into two voltage components having amplitudes proportional respectively to the sine and cosine function of the elevation angle, means for resolving said cosine function voltage component into two voltage components having amplitudes proportional respectively to the sine and cosine function of the azimuth angle, discrete detecting means responsive respectively to the sine voltage component of said elevation angle, the sine voltage component of said azimuth angle and the cosine voltage component of said azimuth angle, a recording drum adapted to be rotatably driven at a prescribed rate of speed, a stylus synchronously driven with said drum and adapted to move axially thereof, means operatively associated with said drum and said stylus for periodically generating a linear sweep voltage having a prescribed slope and a period corresponding in time to one complete revolution of said drum, discrete means responsive to the difference voltage between said sweep voltage and each of the detected voltages whereby discrete signal pulses are generated only when a point on said sweep voltage is equal to the instantaneous magnitude of the respective detected voltage, and means responsive to said discrete signal pulses for energizing said stylus whereby a mark is produced on said drum in accordance with the sine voltage component of said elevation angle and the sine and cosine voltage components of said azimuth angle.

5. The system in accordance with claim 4 and further including an alternating-current stacking voltage of prescribed amplitude derived from said reference source and means for applying said stacking voltage to the input of each of said discrete detecting means whereby the respective detected output voltages vary between prescribed maximum and minimum direct-current voltage levels.

6. The device in accordance with claim 4 and further including means responsive respectively to the voltage amplitudes at the beginning and end of said sweep voltage for generating discrete pulse reference signals of prescribed width corresponding in time to the beginning and end of the axial traverse of said stylus corresponding to each revolution of said drum, and means responsive to each of said reference pulse signals for energizing said stylus whereby a mark is produced on said drum in accordance with the beginning and end of said axial traverse.

7. A system for plotting the continuously varying amplitude of an alternating current voltage comprising a recording drum adapted to be rotatably driven at a prescribed rate, a stylus synchronously driven with said drum and adapted to move axially of said drum, means operatively associated with said drum for periodically generating a linear sweep voltage having a prescribed slope, and a period corresponding to one complete revolution of said drum, means for detecting said alternating current voltage, a differential amplifier having an output equal to the difference between the instantaneous detected voltage and said sweep voltage, a switch comparator tube, normally non-conductive, responsive to said difference output and adapted to be rendered conductive only when the instantaneous magnitude of said detected voltage coincides with an amplitude level of said sweep voltage, an oscillator having its control grid connected to its cathode through said switch comparator tube whereby said ocillator is excited only when said comparator tube is rendered conductive, a coincidence detector responsive to the oscillation signal, means for differentiating the output of said coincidence detector whereby peak pulses of prescribed width are generated corresponding in time to the beginning and end of the coincidence detector output signal, and means responsive to the first peak pulse for energizing said stylus whereby a mark is produced on said drum in accordance with the instantaneous voltage amplitude of the alternating-current voltage source.

References Cited in the file of this patent

UNITED STATES PATENTS 2,718,449  Piety et al. _____ Sept. 20, 1955